(12) United States Patent
Kelson et al.

(10) Patent No.: US 8,068,590 B1
(45) Date of Patent: Nov. 29, 2011

(54) OPTIMIZING PROFITABILITY IN BUSINESS TRANSACTIONS

(75) Inventors: Keith S. Kelson, Dallas, TX (US); Michelle L. Polozola, Richardson, TX (US)

(73) Assignee: Securus Technologies, Inc., Dallas, TX (US)

( * ) Notice: Subject to any disclaimer, the term of this patent is extended or adjusted under 35 U.S.C. 154(b) by 1405 days.

(21) Appl. No.: 11/562,829

(22) Filed: Nov. 22, 2006

Related U.S. Application Data (63) Continuation-in-part of application No. 10/135,883, filed on Apr. 29, 2002, now Pat. No. 7,698,182.

(51) Int. Cl.
*H04M 15/00* (2006.01)

(52) U.S. Cl. ......... 379/114.21; 379/114.23; 379/114.24; 379/114.25; 379/144.02; 379/115.01; 379/114.1; 379/114.02; 379/127.05

(58) Field of Classification Search ............. 379/114.21, 379/114.1, 114.23, 114.28, 115.01, 127.05, 379/114.24, 114.25, 144.02
See application file for complete search history.

(56) References Cited

U.S. PATENT DOCUMENTS

| | | | |
|---|---|---|---|
| 4,797,910 A | 1/1989 | Daudelin | |
| 5,185,781 A | 2/1993 | Dowden et al. | |
| 5,210,789 A | 5/1993 | Jeffus et al. | |
| 5,517,555 A | 5/1996 | Amadon et al. | |
| 5,594,789 A | 1/1997 | Seazholtz et al. | |
| 5,615,408 A | 3/1997 | Johnson et al. | |
| 5,627,887 A | 5/1997 | Freedman | |
| 5,655,013 A | 8/1997 | Gainsboro | |
| 5,832,068 A | 11/1998 | Smith | |
| 5,937,044 A | 8/1999 | Kim | |
| 5,963,625 A * | 10/1999 | Kawecki et al. | ......... 379/127.01 |
| 6,078,892 A | 6/2000 | Anderson et al. | |
| 6,282,276 B1 | 8/2001 | Felger | |
| 6,330,546 B1 | 12/2001 | Gopinathan et al. | |
| 6,353,663 B1 | 3/2002 | Stevens et al. | |
| 6,377,938 B1 | 4/2002 | Block et al. | |
| 6,397,055 B1 | 5/2002 | McHenry et al. | |
| 6,405,028 B1 | 6/2002 | DePaola et al. | |
| 6,430,274 B1 | 8/2002 | Winstead et al. | |
| 6,434,378 B1 | 8/2002 | Fougnies | |
| 6,483,910 B1 | 11/2002 | Council | |
| 6,516,056 B1 | 2/2003 | Justice et al. | |
| 6,636,591 B1 | 10/2003 | Swope et al. | |
| 6,639,977 B1 | 10/2003 | Swope et al. | |
| 6,639,978 B2 | 10/2003 | Draizin et al. | |
| 6,658,393 B1 | 12/2003 | Basch et al. | |

(Continued)

OTHER PUBLICATIONS

Groenfeldt, Tom, "Trimming the telecom tab," CFO: The Magazine for Senior Financial Executives, Oct. 1995, pp. 97-99, v11, n10.

(Continued)

*Primary Examiner* — Melur Ramakrishnaiah
*Assistant Examiner* — Yosef K Laekemariam
(74) *Attorney, Agent, or Firm* — Fogarty, L.L.C.

(57) ABSTRACT

Embodiments of the present invention are directed to systems and methods for processing alternatively billed telephone calls, such as, for example, collect calls and third party calls. In some representative embodiments, a method for completing an alternatively billed call between a calling party and a called party comprises establishing a calling party quality score and completing the alternatively billed call if the calling party quality score meets a threshold. In other representative embodiments, the method further comprises establishing a called party quality score and/or a third party quality score, combining the aforementioned quality scores, and completing the alternatively billed call if the combination of quality scores meets a threshold.

25 Claims, 6 Drawing Sheets

U.S. PATENT DOCUMENTS

| | | |
|---|---|---|
| 6,947,532 B1 | 9/2005 | Marchand et al. |
| 2001/0011228 A1 | 8/2001 | Shenkman |
| 2001/0028705 A1 | 10/2001 | Adams et al. |
| 2002/0025028 A1 | 2/2002 | Manto |
| 2002/0106065 A1 | 8/2002 | Joyce et al. |
| 2002/0115424 A1 | 8/2002 | Bagoren et al. |
| 2002/0136374 A1 | 9/2002 | Fleischer, III et al. |
| 2002/0138417 A1 | 9/2002 | Lawrence |
| 2002/0147002 A1 | 10/2002 | Trop et al. |
| 2002/0184103 A1 | 12/2002 | Shah et al. |
| 2002/0194113 A1 | 12/2002 | Lof et al. |
| 2003/0002639 A1* | 1/2003 | Huie ................... 379/114.27 |
| 2003/0008634 A1 | 1/2003 | Laybourn et al. |
| 2003/0046208 A1 | 3/2003 | Lubking et al. |
| 2003/0138084 A1 | 7/2003 | Lynam et al. |
| 2003/0162526 A1 | 8/2003 | Ogman et al. |
| 2003/0200182 A1 | 10/2003 | Truitt et al. |
| 2004/0078328 A1 | 4/2004 | Talbert et al. |
| 2006/0064380 A1 | 3/2006 | Zukerman |

OTHER PUBLICATIONS

U.S. Appl. No. 10/135,883, Falcone et al.

U.S. Appl. No. 10/135,878, Viola, et al.

* cited by examiner

FIG. 6

OPTIMIZING PROFITABILITY IN BUSINESS TRANSACTIONS

CROSS-REFERENCE TO RELATED APPLICATIONS

The present application is a continuation-in-part of U.S. patent application Ser. No. 10/135,883, filed Apr. 29, 2002, entitled "OPTIMIZING PROFITABILITY IN BUSINESS TRANSACTIONS," which is incorporated herein by reference.

TECHNICAL FIELD

The present invention relates generally to information systems, and more particularly, to optimizing profitability in business transactions utilizing authorization services.

BACKGROUND OF THE INVENTION

The generation of revenue and profitability is the driving force behind most business models. To supplement the cash purchasing methods in today's credit-based society, most businesses depend on some form of credit or entitlement authorization mechanism allowing for customers to purchase products, services, or other such items without the immediate physical exchange of cash. Inherent in such business models is the reality that a percentage of parties who purchase on credit or entitlement authorizations may eventually not pay, thus, diminishing the business' overall profitability.

In order to balance the risk of such losses against the benefits of maintaining credit entitlement systems, businesses go to great lengths to pre-screen credit applicants with lengthy applications requiring a wealth of personal information. This process is often-times slow and many consumers may decide to take their business to a competitor rather than wait for the completion of the credit application process. Such verification methods maximize risk prevention, but are incompatible with situations that require more immediate determinations.

One example of a business that requires more immediate credit/authorization determinations is the telecommunication provider industry, and, more particularly, businesses that provide telecommunication services to controlled-environment facilities, such as prisons, hospitals, hospices, dorms, camps, etc. Residents of controlled-environment facilities are generally given some form of access to telephones, but the calls must be paid for. However, residents of controlled-environment facilities, in general, do not have ready access to cash. Therefore, calls made to nonresidents are typically collect calls (a call for which the charges are billed to the person being called) or third party calls (a call for which the charges are billed to a third party).

As with other credit/authorization systems, some of the collect calls may never be paid for by the called parties. In such circumstances, the telecommunication service provider fails to recover the costs of providing the call, which, in turn, causes a loss of profitability. Bad debt losses may sometimes reach into the tens of millions of dollars for each telecommunication service provider with the industry total well over $1 Billion. For example, in order to address the risk of loss on some of the attempted correctional facility calls, telecommunication service providers sometimes obtain information on the nonresident called parties in order to establish a customer database for providing call verification/authorization. When an inmate attempts to make a collect call, the call or transaction request goes through a validation process. The telecommunication service provider accesses its customer databases and may be able to determine (1) can this call be billed (i.e., is there a billing arrangement with the local exchange carrier (LEC) or the called party), (2) if the destination number is already in the service provider's files, has the allotted credit limit been reached, and (3) has there been any information received from the LEC indicating that the called party has not been paying its bills. Depending on the extensiveness of the service provider's internal resources, the service provider may not be able to determine all three of these validation criteria. If favorable information is retrieved for each of the available validation criteria, the call is completed.

BRIEF SUMMARY OF THE INVENTION

The present invention is directed to systems and methods for gathering and processing information associated with a requestor (e.g., the party initiating a transaction) for the purpose of determining the likelihood that costs incurred during the transaction will be paid for by a requestee (e.g., the party receiving the request for the transaction), or by a third party (e.g., a party who may not directly participate in the transaction but is nonetheless responsible for its costs). The invention may also process information associated with the requestee and/or third party.

In one exemplary embodiment, a calling party (requestor) attempts to make an alternatively billed telephone call, such as, for example, a collect call or a third party call (transaction) to a called party (requestee) from within a controlled-environment facility. In this embodiment, the present invention may gather and process information associated with the calling party such as, for instance, the calling party's period of residency in the facility, criminal history, behavioral characteristics, credit history, and call history. The calling party's call history may include, for example, a list of telephone numbers previously called, the telephone companies servicing those numbers, the frequency of calls made, the number of collect call authorizations previously granted, the collection or payment status of those calls, and the identification of previous called parties, among others. Moreover, when the calling party is a resident of a controlled-environment facility, information associated with the calling party may include the type of facility where the calling party resides (e.g., a prison, hospital, hospice, dorm or camp), its geographic location (e.g., city and state), the call history of other residents of the facility, etc.

One embodiment of the present invention comprises an intelligent transaction scoring system (iTSS) for receiving a transaction request along with an identification of the requestor as well as an identification of the requestee and/or of the third party who may be ultimately responsible for paying for the costs of the products or services incurred during the transaction. When the iTSS receives the transaction request, it accesses information associated at least one of the parties to determine the potential profitability of the transaction. This determination is based upon the calculation of a transaction score, which in turn may be based upon a quality score associated with the requestor, a quality score associated with the requestee, a quality score associated with the third party, or a combination thereof. The transaction is authorized or rejected based upon a comparison between the calculated transaction score and a predetermined threshold level.

After processing the initial transaction request, the iTSS may access additional information related at least one of the parties to refine the transaction score for a more accurate predictive risk assessment. Therefore, when the iTSS receives a subsequent transaction request involving the same requestor, requestee, and/or third party, the subsequent transaction is processed responsive to a comparison of the refined transaction score with the predetermined threshold level. The described embodiment further comprises an intelligent revenue opportunity module (iROM) for implementing a plurality of revenue opportunity applications (ROA) responsive to the transaction score.

The foregoing has outlined rather broadly the features and technical advantages of the present invention in order that the detailed description of the invention that follows may be better understood. Additional features and advantages of the invention will be described hereinafter which faun the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

The present disclosure relates to information systems, and more particularly, to a system and method for optimizing profitability in business transactions. It is understood, however, that the following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
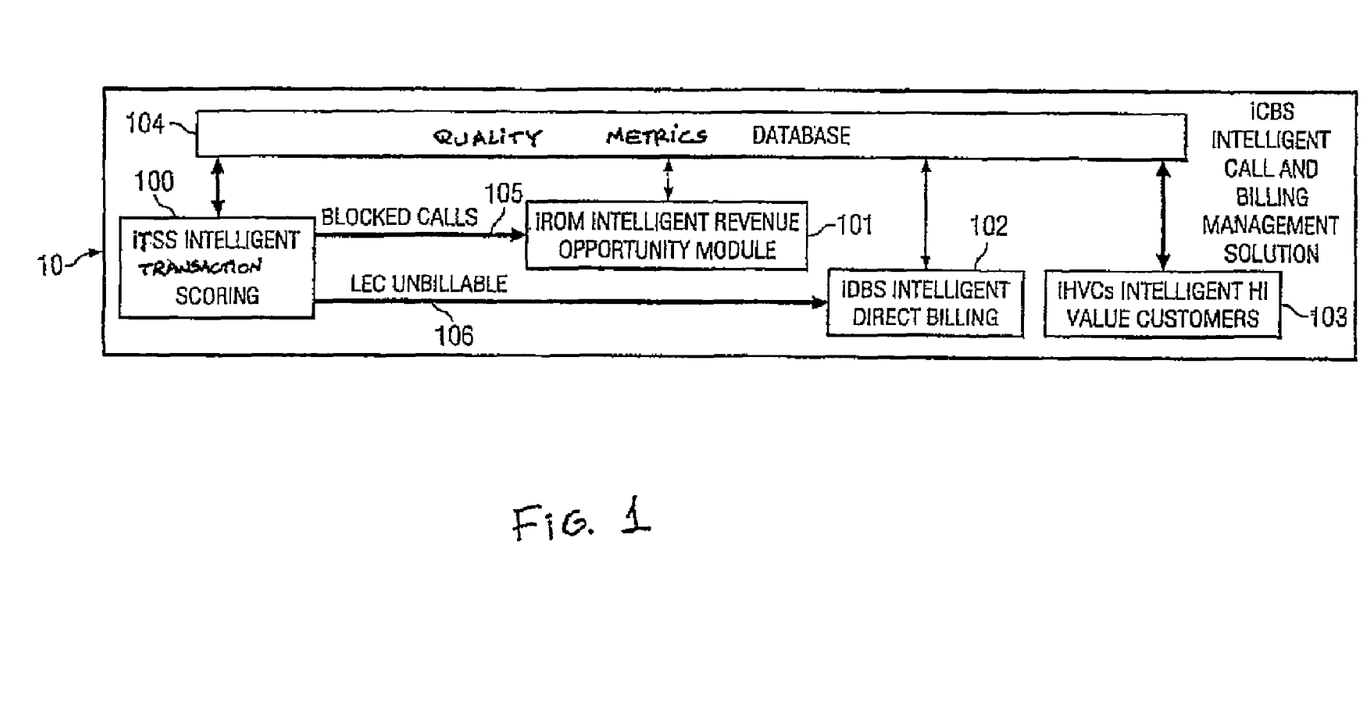
FIG. 1 is a high-level block diagram illustrating one embodiment of the present invention.

Turning now to FIG. 1, an intelligent call and billing management solution (iCBS) 10 comprises a multi-application system for optimizing and maximizing the profitability of business transactions. ICBS 10 of the illustrated embodiment includes intelligent transaction scoring system (iTSS) 100 for establishing a transaction score, and intelligent revenue opportunity module (iROM) 101 for processing the transaction score received from iCSS 100 to produce a recommended revenue opportunity application. The purpose behind the calculation of a transaction score may vary from application to application. In some embodiments of the present invention, a transaction score may represent a predicted risk management score used to authorize or deny requested transactions. In other embodiments, a transaction score may represent a profitability value of a requestor, requestee, and/or third party. ICBS 10 of the illustrated embodiment also includes intelligent direct billing system (iDBS) 102, associated with iROM 101, for selecting any one of a number of direct billing products for a requestor and/or requestee responsive to transaction score-based determinations made within iROM 101.

For iTSS 100 to perform the calculations and predictive risk assessments used in determining a transaction score, iCBS 10 of the illustrated embodiment includes quality metrics database (QMD) 104. QMD 104 comprises quality metrics associated with requestors, requestees, and/or third parties, and it may be continuously updated as iCBS 10 continues interactions and completes transactions for different requestors, requestees, and third parties. As more quality metrics are gathered, they are stored in QMD 104 for future use and evaluation of transaction scores. In one embodiment, QMD 104 is located in the premises of a telecommunications provider. In other embodiments, QMD 104 is a remotely located database accessible via a computer network, such as, for example, the Internet.

In additional embodiments of the present invention, iCBS 10 may also incorporate intelligent high value customer service (iHVC) 103 for providing a variable and selective customer service options in which the selection of the level of service offered is made responsive to the requestor, requestee, or third party's quality score.

As a person of ordinary skill in the art will readily recognize in light of this disclosure, inventive elements of iCBS 10 are intended to be applicable to a wide variety of business models and business situations. However, for the purpose of simplicity and clarity, the description presented below is specifically tailored to a telecommunications service provider operating within a controlled-environment facility. It should also be noted that inventive concepts disclosed herein may be applicable to situations other than those involving payment risk determinations. For example, the present invention may be used for determining the risk of unauthorized call activity (e.g., 3-way calling), even when a calling party has a pre-paid account. In the non-limiting, exemplary embodiment that follows, a calling party (requestor) attempts to make a collect call or a third party call (transaction) to a called party (requestee) from a prison (controlled-environment facility). When the transaction is a collect call, the called party must pay the cost of the call. When the transaction is a third party call, a third party must pay the cost of the call.

Whereas prior art systems typically process information about the called party in order to determine whether a collect call should be completed, the present invention gathers and processes information regarding the calling party in making such determinations. The present invention may also utilize information associated with the called party and/or a third party. One of the many advantages of the present invention is that the calling party's information is typically readily available, given that controlled-environment facilities keep records of their residents. Moreover, by examining the calling party's information, the present invention allows the analysis of data such as, for example, behavioral characteristics or criminal history of the calling party, which may be gathered by the controlled-environment facility where the calling party resides. This type of information, although discovered to be relevant to the determination of profitability by the inventor hereof, has not been addressed by the prior art. Another advantage of an embodiment of the present invention is that the service provider can create and utilize a call history of the calling party, which may be even more indicative of future payment by a called party or third party than information associated with the called party or third party themselves. For example, the calling party's call history may include a list of telephone numbers previously called, the telephone companies servicing those numbers, the frequency of calls made, the number of collect call authorizations previously granted, the collection or payment status of those calls, and the identification of previous called parties.

For example, the inventor hereof has discovered that a calling party's good behavioral characteristics and short criminal history are indicative of the calling party's tendency to associate with persons who typically pay their bills. Conversely, a calling party's long criminal history and bad behavior are indicative that future called parties are less likely to pay for collect calls received. With respect to the calling party's call history, if a previous called party has not paid an outstanding bill, it is more likely that a future call from the same calling party (even when made to a different called party) will not be paid either. Moreover, if most calls originating from a particular controlled-environment facility are often not paid, it is likely that future calls made from the same facility will not be paid. Accordingly, the information gathered about the calling party, called party, and/or third party may be processed to indicate the likelihood that a collect call will ultimately be paid by the called party and/or third party.

In one embodiment, a calling party, called party, and/or third party identification may be received at iCBS 10 and processed by iTSS 100 for establishing respective quality scores. The calling party's identification may be obtained in many different known ways such as, for example, via automatic number identification (ANI), personal identification numbers (PINs), and/or biometric systems such as voice recognition, facial scans, image recognition, fingerprint recognition, iris recognition, retina scans, hand geometry, and the like. The phone number dialed by the calling party may be used to identify the called party. For instance, the service provider may use the dialed number to access a Line Information Database (LIDB) to obtain the called party's information. The called number may be obtained in many different known ways, such as via dual tone, multiple frequency (DTMF) readers, via an Internet protocol (IP) network, via the signaling system 7 (SS7) network, or via dialed number identification service (DNIS) signals provided by the network. Furthermore, the identity of a third party responsible for the costs of the collect call, when applicable, may be provided by the calling party, for example, in the form of a "bill to" telephone number or by providing a third person's or entity's name.

ITSS 100 may consult QMD 104 in order to obtain available quality metrics associated with the calling party, the called party, a third party, and/or the facility. QMD 104 may maintain quality metrics for the calling party such as, for example, an identification of the controlled-environment facility where the calling party resides, the calling party's period of residency in the facility, his criminal history, behavioral characteristics, credit history, and call history. The calling party's call history may include, for example, a list of telephone numbers previously called, the telephone companies servicing those numbers, the frequency of calls made, the number of collect call authorizations previously granted, and the collection or payment status of those calls, among others. Moreover, QMD 104 may maintain quality metrics for the called party such as, for example, LIDB information, payment history, credit history, etc. QMD 104 may also maintain similar information quality metrics for a third party. Furthermore, QMD 104 may maintain information regarding the relationship among the called party, the calling party, and/or the third party, such as, for example, the existence of a family relationship, an attorney-client relationship, a friendship, and a romantic relationship, or the like. Finally, QMD 104 may maintain information regarding the controlled-environment facility where the collect call originates such as, for example, type of facility, its geographic location, and the call history of other residents of the facility, among others.

In one embodiment, each quality metric may be given a particular value. The value associated with a quality metric may be a binary value (e.g., profitable or not profitable), a numerical value, a scaled value, or any other value that may quantify the expected profitability of a transaction involving a party or entity having characteristics such as those listed above. Furthermore, ITSS 100 may establish a calling party quality score based upon the calling party's quality metrics, a called party quality score based upon the called party's quality metrics, and/or a third party quality score based upon the third party's quality metrics. These quality metrics, once established, may be further processed in order to determine a transaction score. In one exemplary embodiment, the transaction score represents a risk level, which may be acceptable depending on the circumstances. In another exemplary embodiment, the transaction score yields an "approved" or "declined" value.

When determining the transaction score, iTSS 100 may utilize the calling party's quality score, the called party's quality score, the third party's quality score or any combination of these quality scores. For instance, the combination of quality scores may be a sum or a weighed average of the calling party's quality score, the called party's quality score, and/or the third party's quality score.

Upon determination of a transaction score, iTSS 100 compares the transaction score against a preset threshold—e.g., a risk threshold, a quality threshold, a profitability threshold, a score threshold, or the like, in order to determine which collect calls (or calls billed to a third party) should be completed and which calls should be blocked. If a call is blocked, a message may be played to the calling party informing him or her of the reason why the call was blocked, or switching the calling party to an operator or interactive voice response (IVR) unit to make arrangements for the requested or future calls. An outgoing call may also be placed by the IVR system to the blocked called party. The outgoing call may inform the called party that a calling party was attempting to reach the called party but was blocked, and may offer the called party alternative products for arranging future calls from the calling party. The called party may also be asked for additional or supplemental detailed information that may be used for refining the called party's quality score. For example, the called party may be asked for their social security number, the length of time at their home/job, whether they rent or own, and the like. Once gathered, this information may be stored in QMD 104 for future use. For security purposes, the outgoing call may also offer the called party an option to permanently block the called party's number from being called. Such circumstances may be necessary to thwart harassment of victims by calling parties.

In the described embodiment of the present invention, iROM 101 may preferably determine the profit opportunities that may exist in the blocked calls. ICBS 10 preferably communicates the called numbers of blocked calls 105 to iROM 101 for rating the related transaction scores. An opportunity risk matrix (ORM) is established by the service provider identifying various service or billing plans aimed at optimizing profit opportunities for some of the blocked calls. The different risk levels found within the ORM may be lower than the threshold level associated with the real-time call authorization procedure. However, the varying levels are preferably selected to correspond to the various transaction scores (e.g., a higher risk transaction score may be paired with a low-risk billing and collection method, while a low risk transaction score may be associated with a higher risk billing and collection plan). As iROM 101 processes the transaction score in comparison to the ORM levels through a software or hardware product or application comparator, a subset of possible revenue opportunity applications is identified as potentially available according to the transaction scores. These possible revenue opportunity applications may either be presented to the parties for selection during one of the outbound calls made from the IVR system, or may be selected and implemented by the service provider directly.

In addition to blocked calls 105, that are blocked based on an initial validation failure, other blocked calls may exist which are blocked for different reasons. For example, in billing situations, if the telecommunications service provider does not have a billing arrangement with a LEC, then the service provider generally cannot bill the LEC for any of the calls that were made to destination numbers serviced by that particular LEC. As noted previously, many of the prior art systems simply block all calls that were made to destination numbers serviced by those non-contracting LECs. In contrast, embodiments of the present invention may communicate unbillable calls 106 to iROM 10 for determining whether a direct billing method would be desirable and/or possible for increasing the potential profits from those previously blocked or lost unbillable calls 106 based upon information regarding the calling party, the called party, a third party, or a combination of such information. Other blocked calls are also communicated to iROM 101 for determining whether a revenue opportunity application or product would be desirable for potentially increasing profits and revenue recovery on similar blocked calls.

In making a determination of possible revenue opportunity applications and products, parameters such as the calling party's quality score, the called party's quality score, the third party's quality score, the potential profit margin available for the type of calls predicted (e.g., long distance vs. local or comparing average call costs vs. recovery margins for different geographic regions or comparing the available billable rates), contractual obligations, commission agreements, governmental regulations, the type of transaction requested, costs for external validation, billing and collection (B&C) costs, rate revenue per call, the cost of the different billing products versus their economic benefits, and the like are considered. By weighing those and other parameters in the iT brain or system processor, iROM 101 preferably selects a variety of different payment products, which may include products such as standard post-paid products or prepaid products. They may also preferably determine a billing cycle, such as every 30 days, every two weeks, or even every few days depending on the transaction score. They may also preferably determine the appropriate payment cycle, such as 30 days, two weeks, or a couple of days from receiving the bill. IROM 101 also preferably determines whether a direct billing product is necessary and/or desirable, or whether LEC billing product is acceptable. For LEC unbillable calls 106, a direct billing system would be desirable as the telecommunication service provider is not capable of billing that particular LEC without a billing arrangement.

For example, when calls are blocked, iCBS 10 may preferably make an automated call to the intended destination number to inform the called party that the calling party's attempted collect call was blocked. The system may then provide the called party several options that may allow the calling party's future calls to that number to be completed. However, instead of calling all of the blocked calls, the system preferably evaluates a transaction score, as well as the additional information described above, to selectively determine which of the blocked called parties represent attractive profit opportunities. Therefore, instead of losing all of the revenue that could be made from the blocked calls, the described embodiment of the present invention preferably optimizes the potential recovery of revenue and ultimate profitability.

As part of the general management functions performed by embodiments of the inventive system, the transaction authorizations may take the form of a credit-type authorization, in which parties are limited to a certain monetary value of credit, or an entitlement-type authorization, in which parties are limited to a numerical, per-use entitlement. In administering either type of usage authorization system, the present invention intelligently sets the usage limit based on individual party segmentation using the transaction score and the additional information considered by iCBS 10 to manage the risk of the transaction.

In the context of a telecommunication service provider, the authorization involves predictive risk management. Therefore, depending on the transaction score of a particular transaction, a resident may be capable of making calls to a called party up to an individually tailored limit on a transaction-by-transaction basis. For example, the system may set a lower usage limit for the allowed costs of a single call based upon an initial transaction score. If, during the course of the call, the usage limit is reached, the called party may either be disconnected, or provided a message and options for paying to extend the call. Similarly, considering a refined transaction score, depending on the actual score, a called party could have a usage limit of anywhere from $20 to $800, depending on the level of investment the service provider is willing to accept or make in its customers. Furthermore, as a customer continues to build a balance closer to the determined usage limit, iCSS 100 may increase the risk level reflected in the transaction or profitability score to reflect the increased investment.

Figure 2:
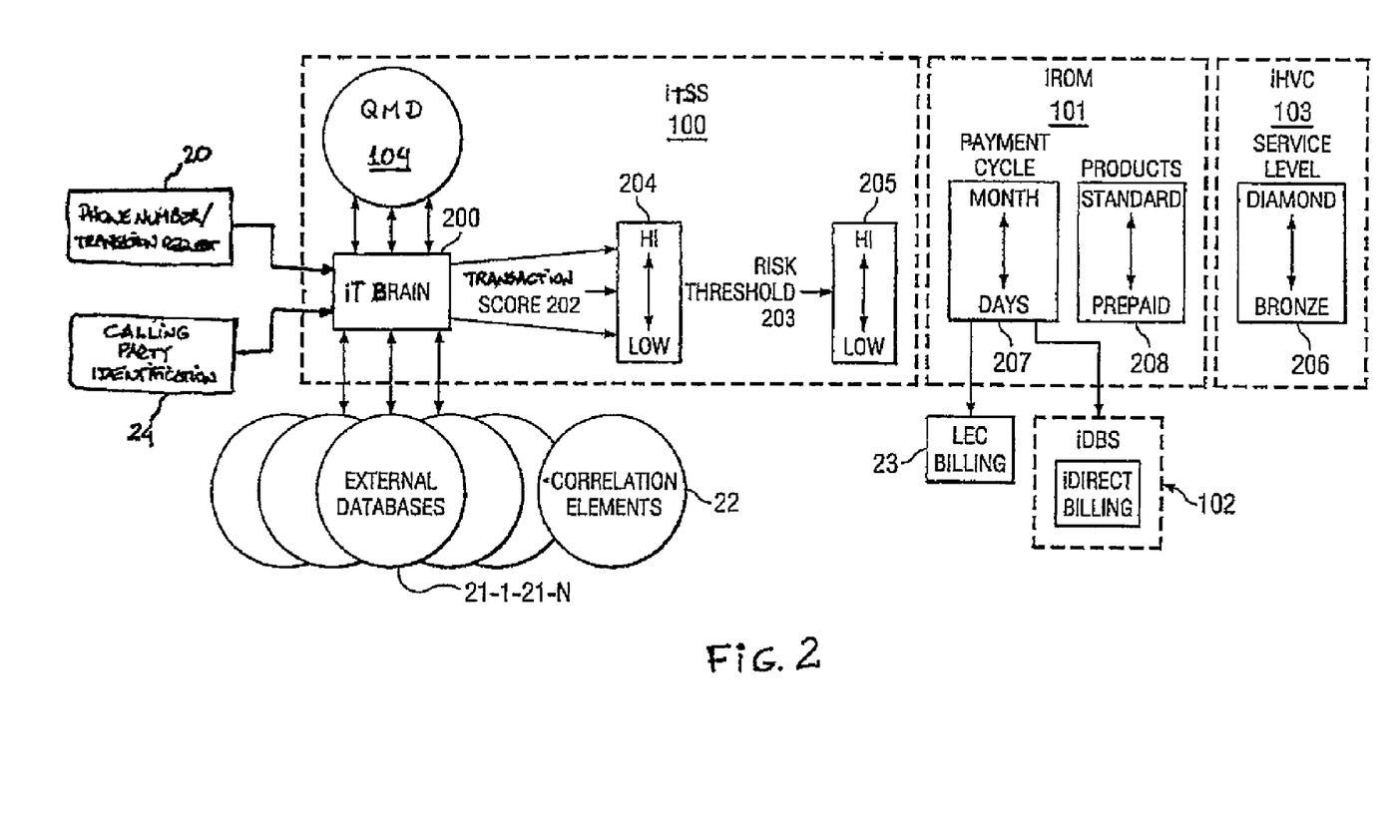
FIG. 2 is a high-level block diagram illustrating a more detailed view of the embodiment shown in FIG. 1.

Turning now to FIG. 2, a high-level block diagram with more a detailed view of some of the elements of iCBS 10, as shown in FIG. 1, is depicted. In an example operation of the described embodiment of the present invention as applied to a controlled-environment facility's telecommunications service provider, the elements of FIG. 2 illustrate an exemplary system configured to implement and execute the described embodiment. In operation, a calling party enters phone number/transaction request 20 for a collect call into one of the facility's phone, which arrives at iCSS 100. Alternatively, the calling party requests that the call be billed to a third party and provides ICSS 100 with the third party's identification. ICSS 100 also receives the calling party's identification 24 as previously described. Phone number, transaction request, and third party's identification 20, and calling party's identification 24 are each received by iCSS 100 and processed at intelligent targeting (iT) brain 200 to preferably determine a predictive risk level associated with the transaction.

As described above, transaction score 202 may be based upon a calling party quality score, a called party quality score, a third party quality score, or any combination thereof. Initially, quality scores may be based upon the information gathered from QMD 104. Transaction score 202 typically lies within preset risk range 204. Depending on the system used by the telecommunication provider, a high score may correlate to a low risk, high profitability transaction request, whereas a low score would represent a high risk, low profitability transaction request. It should be noted that other scoring systems with different representations of risk levels may also be used in preset risk range 204. Transaction score 202 is then compared by iT brain 200 with threshold 203. Threshold 203 may also preferably be pre-selected by the telecommunication service provider on a sliding scale represented by threshold range 205. If the risk level associated with transaction score 202 represents a lower risk than threshold 203, iCSS 100 allows transaction request 20 to be completed. However, if transaction score 202 represents a higher risk value than threshold 203, transaction request 20 is denied or blocked.

After iT brain 200 makes the determination of whether to block or connect transaction request 20, it begins to refine transaction score 202 by accessing external databases 21-1 through 21-N. The process of accessing external databases 21-1 through 21-N may be referred to as data mining. IT brain 200 mines for data associated with the calling party, called party, and/or third party that would indicate a tendency for a low or high transaction score. Such information may include payment histories for certain on-line vendors, in-service dates for the destination phone number, the type of dwelling that is serviced by the destination telephone number (i.e., whether the dwelling is a home or an apartment), accurate BNA information, and the like. IT brain 200 preferably mines data in external databases 21-1 through 21-N and finds correlation elements 22 to correlate the data mined with a relevant party, preferably within a period of time after the initial collect call being made.

After completion of the data mining process and evaluation of all correlation elements 22, iT brain 200 preferably recalculates a predictive risk management value and refines transaction score 202, which preferably represents a more accurate investigation and prediction into the predictive risk of the transaction. The eventual level of transaction score 202 may indicate to iCSS 100 that future calls should either be blocked or be turned over to iROM 101 for determination of a revenue opportunity product to be offered to the parties. Relevant data retrieved during this process may be stored in QMD 104 as quality metrics associated with one of the parties for quality score determinations in future transactions.

When a revenue opportunity product is desirable, iCSS 100 preferably communicates transaction score 202 to iROM 101 for determining appropriate revenue or profit opportunity products or applications to offer or select for the parties. IROM 101 examines transaction score 202 and compares it to the ORM to select various payment and billing products according to cycle list 207 and product list 208. The service provider would either present the list of possible products to the parties for selection, or select the most desirable product automatically. For example, if the called party is serviced by a LEC which does not have a billing arrangement with the telecommunication service provider, yet its transaction score 202 represents a low risk and high profitability margin, iROM 101 may select to offer standard payment products, which include post-paid products billed directly by the service provider on a monthly payment cycle. These high-valued customers may also preferably warrant additional grace periods in which to make payments after the 30-day cycle. In contrast, if transaction score 202 represents a higher risk value than threshold 203, but still offers a reasonable predictive risk of recovering revenue, iROM 101 may select to offer different prepaid calling packages to the parties, including various denominations and accounts to pay for future or pending collect calls. Additionally, if transaction score 202 represents a high predictive risk, but still an acceptable level, instead of a prepaid product, a standard post-paid bill product may be offered. However, instead of providing for a 30 day billing cycle as with the lower risk customers, iROM 101 may select more frequent billing cycles, such as billing every three days, with a payment return time of three days. In this manner, the higher risk transactions will be billed more quickly and, if their payments are not received in the time allotted, individual accounts may be blocked before further costs are expended completing calls that may not be paid for.

In conjunction with the revenue opportunity products offered by iROM 101, iDBS 102 adds direct billing methods to supplement the revenue opportunity products. For example, if transaction score 202 has a very low risk level but the destination number is served by a LEC which does not have a billing agreement with the telecommunication provider, iCBS 10, as depicted in FIG. 1, would still operate to optimize profits from such potential callers by implementing a direct billing scheme from iDBS 102, which sends bills directly to the called party to pay for collect calls made from the facility. Thus, the method described in this embodiment of the present invention operates to optimize profits that would otherwise go unrealized. It should be noted that additional necessity for direct billing may generally arise when iROM 101 designates or selects billing and/or payment cycles of less than the standard 30 day periods. Because typical LECs do not bill in cycles less than 30 days, telecommunications providers may bill those clients directly for the shortened billing and/or payment cycles. Alternatively, for low risk, high profit margin transactions, standard billing through LEC billing 23 may be continued. The ultimate choice of billing products preferably results from a comparison of the cost and economic benefits for the different available products.

Additional embodiments of the present invention may also include iHVC 103 to provide customer services. As in any other service oriented business, customer service and customer satisfaction is important in maintaining revenue and also increasing the recovery of revenue and ultimate firm profitability. With these goals in mind, iCBS 10, as depicted in FIG. 1, provides a system for offering variable levels of service to customers depending on the value of the transaction score 202. For example, average customers who pay a small amount on low margin accounts may be placed into a queue for an interactive voice response (IVR) system in order to access help applications or caller customer services. In contrast, parties to a transaction with transaction score 202 that represent very low predictive risk and very high profit margin may be treated differently in the service center interactions. These higher valued transactions may, for instance, be placed at the beginning of the queue to the IVR system. Alternatively, the higher valued customers may have a separate customer service access number to call that offers fewer and shorter waiting periods and possibly even more customer service opportunities. Even further, the highest valued customers may be directly connected to live operators in order to access the customer service system. In creating the different service levels in service level list 206, iCBS 10 of FIG. 1 operates to preserve and extend the possible revenue recovery from the highest valued transactions, while at the same time providing incentive for the lower valued (i.e., higher predictive risk and lower profit margin) customers to increase their customer or profitability score to obtain higher levels of service.

Figure 3:
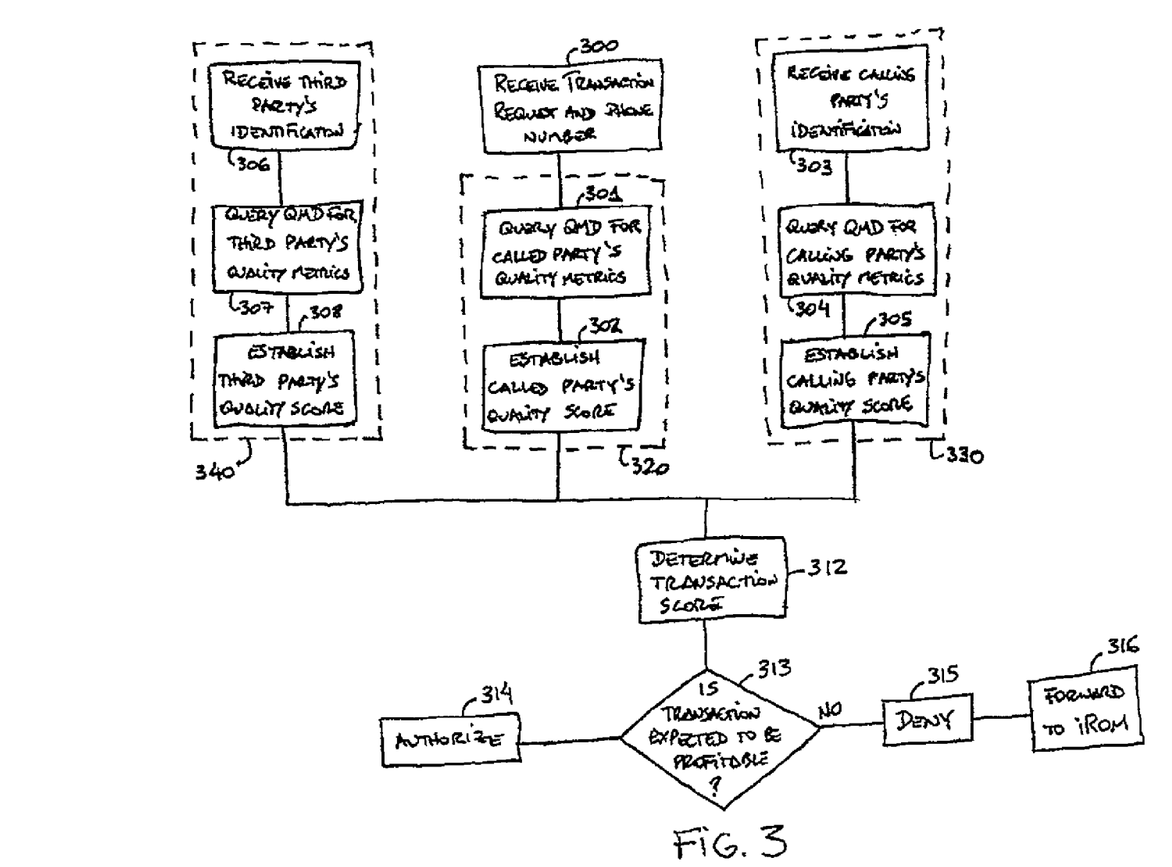
FIG. 3 is a flowchart illustrating steps that may be used to implement an intelligent transaction scoring system used in embodiments of the present invention.

FIG. 3 is a flowchart that illustrates the steps implemented in carrying out the function of iCSS 10 of the revenue optimizing system of a described embodiment of the present invention as shown in FIGS. 1 and 2. In step 300, iCSS 10 receives a transaction request along with the called party's phone number. QMD 104 may provide at least one quality metric associated with the called party in step 301, who may be identified by the phone number received or by other methods previously described. In step 302, iCSS 10 may calculate a called party's quality score based upon quality metrics obtained from QMD 104. Additionally or alternatively, iCSS 10 may receive a calling party identification in step 303 and query QMD 104 for at least one quality metric associated with the calling party in step 304. In step 305, iCSS 10 may calculate a calling party's quality score based upon quality metrics obtained from QMD 104. Additionally or alternatively, iCSS 10 may receive a third party identification in step 306 and query QMD 104 for at least one quality metric associated with the third party in step 307. In step 308, iCSS 10 may calculate a third party's quality score based upon quality metrics obtained from QMD 104.

In step 309, iCSS 10 determines a transaction score based upon at least one of the aforementioned quality scores. In one embodiment, the steps within blocks 320 and 340 are not performed, and iCSS 10 utilizes only the quality score of the calling party in determining the transaction score. In another embodiment, the steps within block 340 are not performed, and iCSS 10 utilizes both the calling party's quality score and the called party's quality score in determining the transaction score. In a situation where a third party will be billed for the costs of the collect call between the calling party and the called party, the steps within block 340 are performed, and the third party's quality score is also considered. As a person of ordinary skill in the art will readily recognize in light of this disclosure, several different combinations of quality scores may be used depending upon the availability of information regarding the parties and/or the facility.

In step 310, iCSS 10 determines whether the transaction is expected to be profitable by comparing the transaction score with a threshold. In one embodiment, if the transaction score is higher than the threshold, the transaction is authorized in step 311. On the other hand, if the transaction score is lower than the threshold, the transaction is denied in step 312 and forwarded to iROM 101 in step 313.

Figure 4:
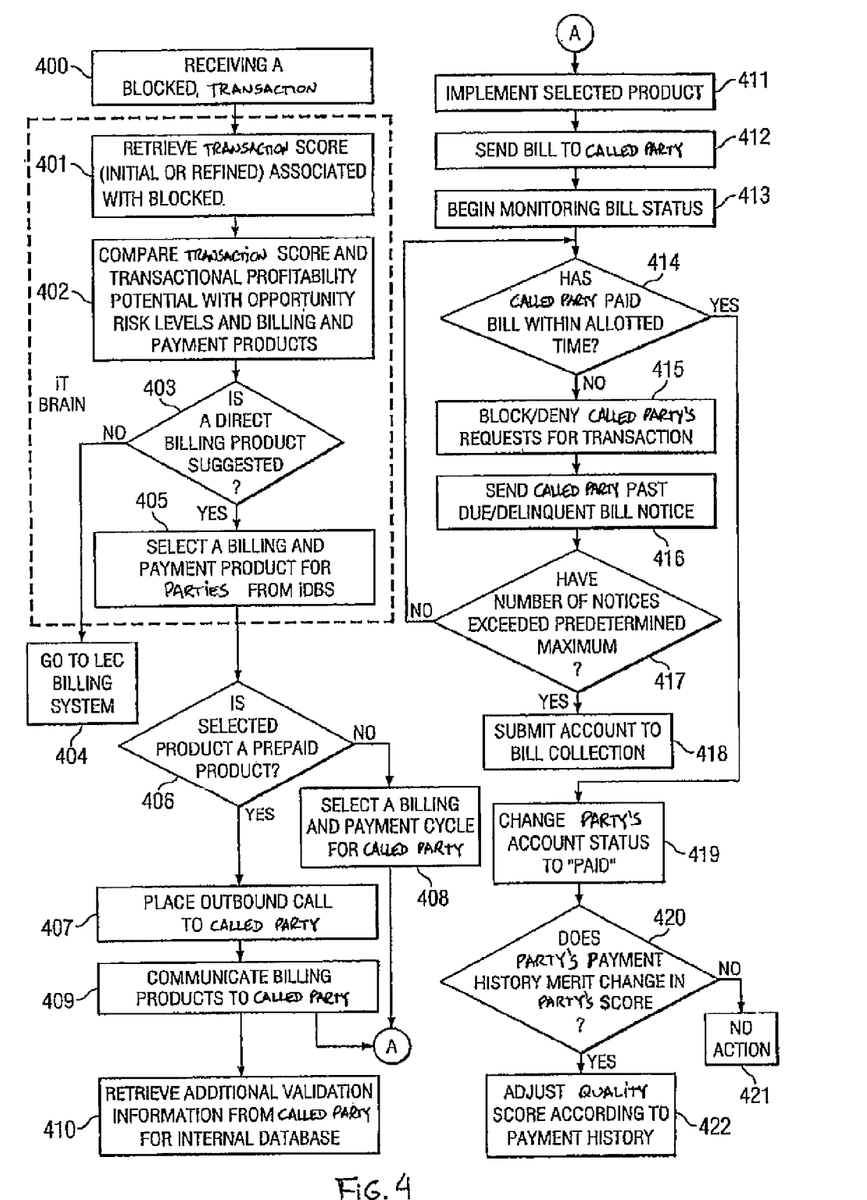
FIG. 4 is a flowchart that represents the steps of functional interaction between an iROM and an iDBS of embodiments of the invention.

FIG. 4 is a flow chart that represents the steps of functional interaction between the iROM and the iDBS, as shown in FIGS. 1 and 2. The iROM is preferably accessed in response to the delivery of a particular transaction score corresponding to a blocked call in order to determine whether a revenue opportunity exists in providing one or more of the revenue opportunity products. In step 400, the iROM receives the information associated with a blocked transaction. Upon receipt of that information, the iROM retrieves the transaction score (either initial or refined) associated with that transaction in step 401. The iROM is generally implemented when blocked transactions are received; whether those blocked accounts are due to a bad debt or due to the destination numbers being serviced by a LEC without a billing arrangement with the communication provider. In step 402, the iROM preferably compares the transaction score with Opportunity Risk Levels (ORM) to identify possible applicable revenue or profit generation applications and billing and payment products.

The iROM determines whether a direct billing product would be available or beneficial to the parties in step 403 based on its cost and economic benefits. If no direct billing product is suggested, then, in step 404, the iROM passes the billing structure over to a standard third-party-billing-authority option, such as the LEC billing in the example above. If, on the other hand, it is determined that an appropriate direct billing product may be available from the iDBS, the iROM identifies and/or selects a particular product or a set of possible products for the parties in step 405. In step 406, a determination is made whether the selected product or products are pre-paid products or post-paid products. If one or more of the selected products is a pre-paid product, the product is grouped for presentation to the called party in steps 407 and 408. If, however, the selected product includes a post-paid product, the iDBS, responsive to the transaction score comparison, will select the appropriate variable billing cycle and/or variable payment cycle for the called party in step 408. The identified post-paid products may also be assembled with any of the identified prepaid products for presentation to the called party in steps 407 and 408. However, the in the described embodiment, the system preferably automatically selects the specific direct billing product that is most beneficial for profit optimization. In step 407, the system may place an outbound call to the called party at the telephone number. During the call, the different identified prepaid and/or post-paid products are presented to the called party to select for facilitating future transactions in step 409. Additionally, in step 410, the system retrieves additional validation and/or identification data from the called party to supplement the information contained in QMD 104. Upon receiving the product selection from the called party, the system implements the selected product in step 411.

If a post-paid product is selected, the system sends the bill directly to the called party or third party in step 412. Once the bill has been sent to the called party or third party, the system preferably begins to monitor the bill status of the outstanding pending bill in step 413. As a part of the monitoring process, in step 414, the system determines whether the called party or third party has fully paid the bill within the time allotted. If the called party or third party has not fully paid the bill within the allotted time, the system preferably blocks or denies any future or pending requests in step 415. The iDBS preferably sends the called party or third party a past due or delinquent notice in step 416. Depending on the number of past due or delinquent notices, as determined by step 417, the called party or third party's account may either be submitted to a bill collection service in step 418, or passed back to the decision block of step 414 to determine whether the called party or third party has paid the bill. As soon as the called party or third party is detected to have paid the bill, the status on the its account is preferably changed to a "paid" status in step 419.

In order to maintain an accurate predictive risk management level or transaction score, the iT brain may dynamically adjust the profitability or quality score associated with the parties to a transaction. In step 420, in addition to gathering the additional information from both the internal and external databases, it is determined whether the specific payment history of the called party or third party merits any change in its quality score. If no change is indicated, no action is taken in step 421. However, if an adjustment is merited according to the payment history, the system preferably recalculates or adjusts (i.e., refines) the called party or third party's quality score according to its payment history in step 422. For example, if a called party has numerous delinquent notices, and/or numerous late payment notices, the system may preferably adjust the called party's quality score to reflect a higher predictive risk associated with that party. Conversely, if a called party has exhibited a good bill payment history over a period of time, the system may preferably adjust its quality score to reflect a lower predictive risk value. Thus, as the iT brain learns more about the payment characteristics of a party, the party's quality score or profitability level is preferably adjusted accordingly to accurately reflect the level of profitability or predictive risk for that party.

Figure 5:
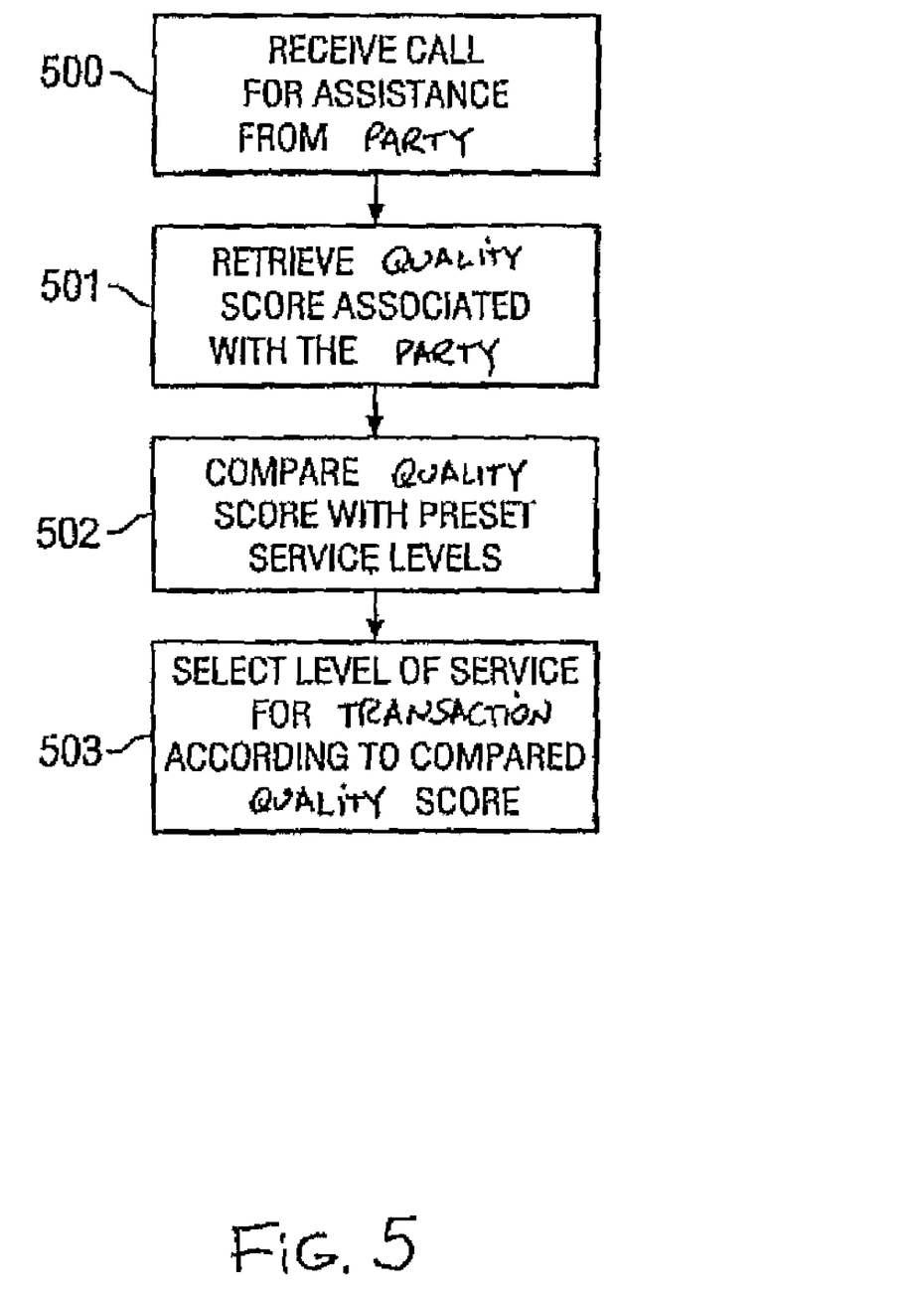
FIG. 5 is a flowchart illustrating steps that may be used to implement the intelligent high-value transaction system used in embodiments of the present invention.

FIG. 5 is a flowchart that represents steps that may be implemented when executing the functions of iHVC 103 of the described embodiment of the present invention shown in FIGS. 1 and 2. In step 500, iHVC 103 receives a call for assistance from a party. The call may be placed to a customer call center, or some other IVR system that implements a customer service call center. Once the call has been received, iHVC 103 retrieves the quality score associated with the particular party in step 501. In step 502, the party's quality score is compared against the matrix of preset service levels. IHVC 103 then selects a particular level of service for the transaction responsive to the compared quality score, in step 503. The resulting service provided may, therefore, vary according to a party's quality score.

It should be noted that the present invention is not limited to the described embodiment tailored for telecommunication service providers. Alternative embodiments of the present invention may be applied to other businesses as well. For example, remaining in the telecommunications industry, the collect call (i.e., 0+, 1-800-COLLECT, 1-800-CALL-ATT, etc.), 10-10-XXX long distance services, and the like may also implement the present invention to improve its capability for optimizing profitability. Outside of the telecommunication industry, credit and billing systems may be based on the present invention keying credit authorization and risk-dependent transactions on telephone numbers with variable billing and service procedures selectively tailored for the individual customer segment. Any system in which a telephone number may be used to designate the ultimately responsible party may implement various embodiments of the present invention.

Additionally, outside of the credit authorization sectors, call centers may be able to implement various embodiments of the present invention for selectively offering customer service to various callers based on the quality scores for potential profitability. For instance, if a caller calls into a business call center, a quality score analysis may be performed to determine that the caller is likely a profitable potential customer. As a result of this customer quality score, the call center may direct the caller to a more personal calling experience to enhance the callers interaction with the call center.

When implemented in software, the elements of the present invention are essentially the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Figure 6:
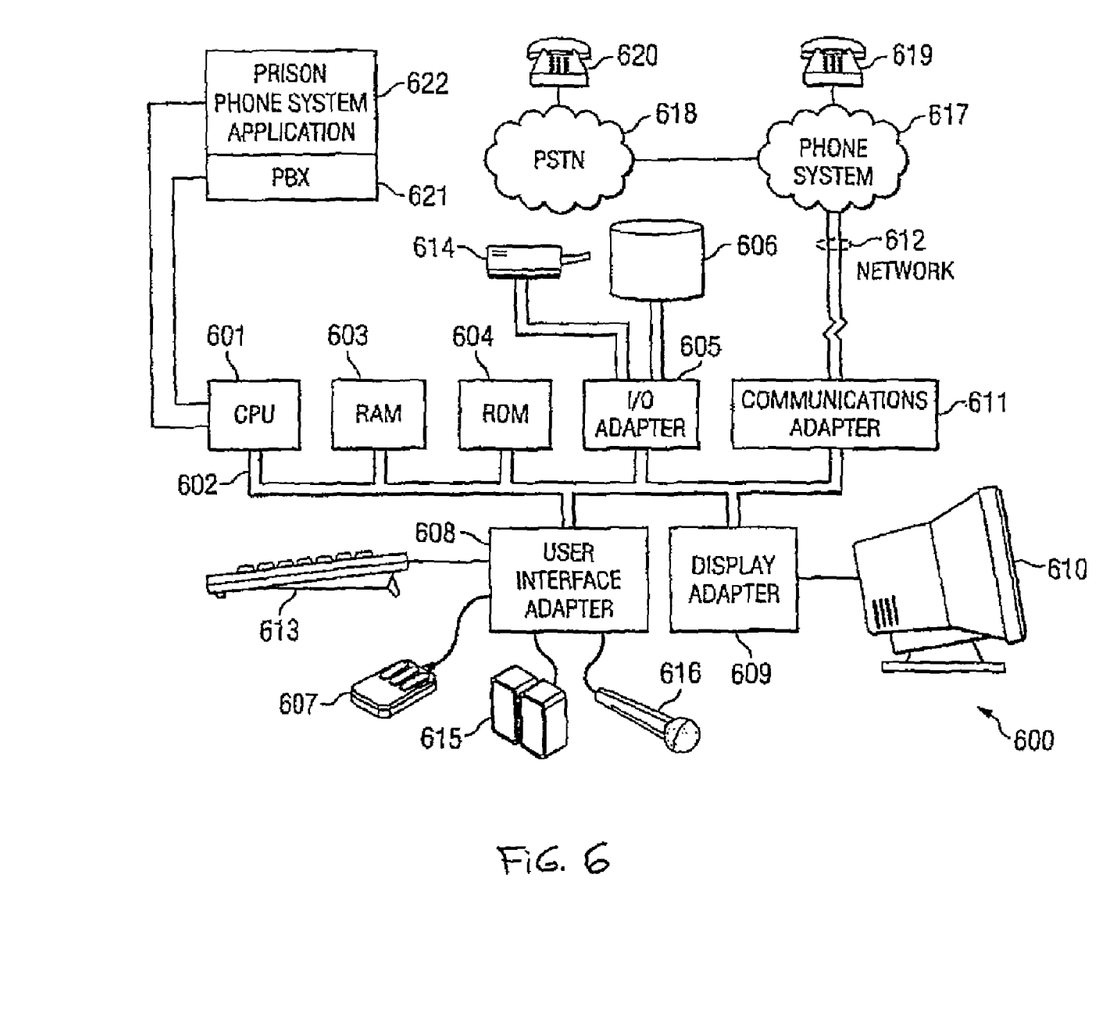
FIG. 6 depicts a block diagram of a computer system which is adapted for use according to embodiments of the present invention.

FIG. 6 illustrates computer system 600 adapted to use the present invention. Central processing unit (CPU) 601 is coupled to system bus 602. The CPU 601 may be any general purpose CPU. However, the present invention is not restricted by the architecture of CPU 601 as long as CPU 601 supports the inventive operations as described herein. Bus 602 is coupled to random access memory (RAM) 603, which may be SRAM, DRAM, or SDRAM. ROM 604 is also coupled to bus 602, which may be PROM, EPROM, or EEPROM. RAM 603 and ROM 604 hold user and system data and programs as is well known in the art.

Bus 602 is also coupled to input/output (I/O) controller card 605, communications adapter card 611, user interface card 608, and display card 609. The I/O adapter card 605 connects to storage devices 606, such as one or more of a hard drive, a CD drive, a floppy disk drive, a tape drive, to the computer system. The I/O adapter 605 is also connected to printer 614, which would allow the system to print paper copies of information such as document, photographs, articles, etc. Note that the printer may a printer (e.g. dot matrix, laser, etc.), a fax machine, or a copier machine. Communications card 611 is adapted to couple the computer system 600 to a network 612, which may be one or more of a telephone network, a local (LAN) and/or a wide-area (WAN) network, an Ethernet network, and/or the Internet network. User interface card 608 couples user input devices, such as keyboard 613, pointing device 607, and microphone 616, to the computer system 600. User interface card 608 also provides sound output to a user via speaker(s) 615. The display card 609 is driven by CPU 601 to control the display on display device 610.

When operating any one or number of embodiments of the present invention as shown in FIGS. 1 and 2, and, in particular, the telecommunication service provider embodiment described herein, computer system 600 preferably connects via network 612 to phone system 617, which is connected at some interface point to public switched telephone network (PSTN) 618. Computer system 600 preferably includes software applications, private branch exchange (PBX) 621 and phone system application 622, run from CPU 601 to control all aspects of the present invention. As residents attempt to call from phone 619 to destination number/phone 620, the embodiment of the present invention running on computer system 600 facilitates the connection and the probabilities that the service provider will recover the cost and revenue related to that call.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for completing an alternatively billed call between a calling party and a called party, the method comprising: establishing a calling party quality score; establishing a called party quality score; combining the calling party quality score with the called party quality score; and completing the alternatively billed call if the combination of calling and called party quality scores meets a threshold.

2. The method of claim 1, where the alternatively billed call is a collect call.

3. The method of claim 1, where the alternatively billed call is a third party call.

4. The method of claim 1, where establishing the calling party quality score comprises determining at least one calling party quality metric.

5. The method of claim 4, where the at least one calling party quality metric comprises a calling party's period of residency in a controlled-environment facility.

6. The method of claim 5, where the at least one calling party quality metric comprises a type of controlled-environment facility.

7. The method of claim 5, where the at least one calling party quality metric comprises a geographical location of the controlled-environment facility.

8. The method of claim 5, where the at least one calling party quality metric comprises a call history of at least another resident of the controlled-environment facility.

9. The method of claim 4, where the at least one calling party quality metric comprises a behavioral characteristic of the calling party.

10. The method of claim 4, where the at least one calling party quality metric comprises a criminal history of the calling party.

11. The method of claim 4, where the at least one calling party quality metric comprises a call history of the calling party.

12. The method of claim 11, where the call history comprises a frequency of calls made by the calling party.

13. The method of claim 11, where the call history comprises a number of call authorizations granted to the calling party.

14. The method of claim 11, where the call history comprises the identity of at least one other party previously called by the calling party.

15. The method of claim 11, where the call history comprises a quality score associated with the at least one other party.

16. The method of claim 13, where establishing the called party quality score comprises determining at least one called party quality metric.

17. The method of claim 16, where the at least one called party quality metric comprises a payment history of the called party.

18. The method of claim 16, where the at least one called party quality metric comprises a credit history of the called party.

19. The method of claim 16, where the at least one called party quality metric comprises a relationship between the calling party and the called party.

20. A method for completing an alternatively billed call between a calling party and a called party, the method comprising: establishing a calling party quality score:
  establishing a third party quality score;
  combining the calling party quality score with the third party quality score; and
  completing the alternatively billed call if the combination of the calling party and third party quality scores meets a threshold.

21. The method of claim 20, where establishing the third party quality score comprises determining at least one third party quality metric associated with a third party, where the third party is not a party to the alternatively billed call.

22. A method for completing a call that is billed to a party other than a calling party, the method comprising:
  establishing a calling party quality score associated with the called party;
  establishing a called party quality score associated with the called party;
  combining the calling party quality score with the called party quality score by computing a weighted average of the calling party quality score and the called party quality score; and
  completing the call if the combination of quality scores meets a threshold.

23. The method of claim 22, where the call is a collect call.

24. The method of claim 22, where the call is a third party call.

25. The method of claim 22, further comprising:
  establishing a third party quality score associated with a third party, where the third party does not participate in the alternatively billed call;
  combining the third party quality score with the calling party quality score and the called party quality score; and
  completing the call if the combination of quality scores meets a threshold.

* * * * *